United States Patent
Tiedmann et al.

(10) Patent No.: US 9,064,197 B2
(45) Date of Patent: Jun. 23, 2015

(54) RFID APPAREL TAG FOR USE IN INDUSTRIAL PROCESSING AND POST CARE TREATMENT

(75) Inventors: Heiko Tiedmann, Dachau (DE); Dirk Poggemeier, Herford (DE); Kai Hauck, Wetter (DE)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/508,890

(22) PCT Filed: Nov. 24, 2010

(86) PCT No.: PCT/US2010/057961
§ 371 (c)(1),
(2), (4) Date: May 9, 2012

(87) PCT Pub. No.: WO2011/066358
PCT Pub. Date: Jun. 3, 2011

(65) Prior Publication Data
US 2012/0234921 A1  Sep. 20, 2012

Related U.S. Application Data

(60) Provisional application No. 61/264,268, filed on Nov. 25, 2009.

(51) Int. Cl.
| | | |
|---|---|---|
| *G06K 19/00* | (2006.01) |
| *G06K 19/02* | (2006.01) |
| *G06K 19/077* | (2006.01) |
| *G08B 13/24* | (2006.01) |
| *G08B 21/02* | (2006.01) |
| *G08B 13/14* | (2006.01) |

(52) U.S. Cl.
CPC ....... *G06K 19/07749* (2013.01); *Y10T 29/4913* (2013.01); *G08B 13/2445* (2013.01); *G08B 21/0275* (2013.01); *G08B 13/2434* (2013.01); *G06K 19/02* (2013.01); *G06K 19/027* (2013.01)

(58) Field of Classification Search
CPC .......... G08B 13/2445; G08B 13/2434; G08B 21/0275; G06K 19/07749
USPC .................... 235/487, 488; 340/572.1, 572.8; 702/57; 209/3.3; 428/190
See application file for complete search history.

(56) References Cited

U.S. PATENT DOCUMENTS

| | | | | |
|---|---|---|---|---|
| 5,583,489 | A * | 12/1996 | Loemker et al. ........... 340/572.8 |
| 5,756,986 | A * | 5/1998 | Gustafson .................... 235/492 |
| 7,333,013 | B2 * | 2/2008 | Berger ..................... 340/539.12 |
| 7,345,583 | B2 * | 3/2008 | Reid et al. .................. 340/568.1 |
| 7,724,144 | B2 * | 5/2010 | Bleckmann et al. ....... 340/572.8 |
| 2001/0050616 | A1 * | 12/2001 | Lowe ......................... 340/572.1 |
| 2003/0072676 | A1 * | 4/2003 | Fletcher-Haynes et al. .... 422/23 |
| 2005/0130389 | A1 * | 6/2005 | Yamazaki et al. ............ 438/455 |
| 2005/0183990 | A1 * | 8/2005 | Corbett, Jr. .................... 209/3.3 |

(Continued)

*Primary Examiner* — Thien M Le
*Assistant Examiner* — Claude J Brown
(74) *Attorney, Agent, or Firm* — Avery Dennison Retail Information Services

(57) ABSTRACT

The present invention is in the field of garment or apparel labels that includes RFID devices. More particularly, the garment or apparel tags or labels are enclosed in a flexible bag created by a fluid impervious material that protects the RFID device from maintenance and care treatments as well as garment and apparel processing conditions which may be used to provide certain aesthetic or other characteristics to the apparel item.

23 Claims, 4 Drawing Sheets

(56) References Cited

U.S. PATENT DOCUMENTS

| | | | |
|---|---|---|---|
| 2005/0270158 A1* | 12/2005 | Corbett, Jr. | 340/572.1 |
| 2006/0021270 A1* | 2/2006 | Hanley | 40/638 |
| 2006/0152368 A1* | 7/2006 | Turner et al. | 340/572.1 |
| 2006/0238345 A1* | 10/2006 | Ferguson et al. | 340/572.1 |
| 2007/0217717 A1* | 9/2007 | Murray | 383/38 |
| 2008/0020189 A1* | 1/2008 | Hofmair et al. | 428/190 |
| 2008/0189059 A1* | 8/2008 | Choong et al. | 702/57 |
| 2009/0167502 A1* | 7/2009 | Erickson et al. | 340/10.3 |
| 2010/0079286 A1* | 4/2010 | Phaneuf | 340/572.1 |
| 2010/0177991 A1* | 7/2010 | Chen | 383/109 |
| 2010/0177993 A1* | 7/2010 | Chen | 383/207 |
| 2010/0214080 A1* | 8/2010 | Alexis | 340/10.51 |

\* cited by examiner

RFID APPAREL TAG FOR USE IN INDUSTRIAL PROCESSING AND POST CARE TREATMENT

CROSS-REFERENCE TO RELATED APPLICATION

The present application is a 371 of International Application No. PCT/US2010/057961, which was published in English on Jun. 3, 2011, which claims priority to U.S. Provisional Application No. 61/264,268 filed Nov. 25, 2009 which is incorporated herein by reference in it.

FIELD OF THE INVENTION

The present invention is in the field of tags used for inventory control and security of consumer goods. More particularly, the present invention relates to an integral tagging solution that is resistant to conditions encountered during washing and dry cleaning and may withstand garment treating processes used in creating particular aesthetic effects in apparel or garment items.

BACKGROUND OF THE INVENTION

The use of radio frequency identification (RFID) to identify one of a plurality of items is well known. Typical radio frequency identification (RFID) tags or integrated circuits include a microprocessor, also known as a microchip, electrically connected to an antenna. Alternatively, the microchip is first attached to a pad having electrical leads that provides a larger attachment of "landing" area. This is typically referred to as a "strap" or "interposer." The strap is then attached to the antenna.

The microprocessor stores data, can include identifying data unique to a specific item that is transmitted to an external receiver for reading by an operator and processing of the item. RFID tags can be attached to items for inventory control, shipment control, and the like. RFID tags are particularly useful in identifying, tracking and controlling items such as packages, pallets, and other product containers. The location of each item can be tracked and information identifying the owner of the item or specific handling requirements can be encoded into the RFID and later read by a scanning device capable of decoding and displaying the information.

Garment care and other labels are also well known and typically include care instructions, brand identification and other information such as source origin that are either required by certain regulations or are used in connection with the manufacturers marketing objectives. While RFID devices have been used in inventory management of garments and apparel items, the RFID devices can be detuned or destroyed through the washing or processing of the garment rendering tracking of the garment through subsequent inventory or treatment stations very difficult if not impossible.

What is needed therefore is a solution that protects the RFID device from such extreme conditions encountered during treatment steps and allows a retailer to continue to utilize the beneficial aspects of RFID technology.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to a garment or apparel label or tag that includes a unique RFID device arrangement, which protects the functional attributes of the RFID device during normal care and cleaning of the garment, such as with washing and dry cleaning, and also prevents damage to the RFID device during garment treating or processing to produce a particular aesthetic effect or characteristic, such as stone wash or acid washing of denim or "blue" jeans.

In one exemplary embodiment of the presently described invention, a RFID apparel tag is presented and includes a substrate that has first and second surfaces. The RFID device is adhesively secured to the substrate first face. The RFID device has a dimension and has a chip and an antenna. A liquid impermeable material is disposed over the RFID device and extends beyond the dimension of the RFID device in at least a first direction so as to substantially cover the chip and antenna and the material is permanently adhered to the substrate first face.

In a further exemplary embodiment of the presently described invention, a RFID garment label is provided and includes a substantially quadrate substrate that has first and second sides and first and second transversely extending edges and first and second longitudinally extending sides. A line of weakness extends between the first and second longitudinally extending sides and is substantially adjacent the first transversely extending end edges. A RFID inlay that has a chip and an antenna and, with the chip and antenna being laminated between plastic films. The RFID inlay has first and second sides. A layer of adhesive is provided between the second side of the RFID inlay and the first side of the substrate. The layer of adhesive suitable for the present invention may be a pressure sensitive adhesive either permanent or removable. A fluid impervious layer is disposed over the RFID inlay and is permanently secured to the first side of the substrate and along a greater extent of each of the first and second longitudinal sides and adjacent the second transversely extending end edge. The fluid impervious layer may form a flexible enclosure over the RFID inlay.

The present invention also contemplates that the fluid impervious layer may form a rigid structure over the RFID inlay.

In a further exemplary embodiment of the presently described invention, a method of producing a RFID garment tag is presented and includes the steps of providing a substrate. Then a RFID inlay is applied to a portion of the substrate. The RFID inlay is covered with a fluid impervious material such that the fluid impervious material substantially covers the RFID inlay to form a flexible bag. The fluid impervious material is welded to the substrate along each edge of the material to form a garment tag and finally, the garment tag is secured to a garment.

In addition to the foregoing embodiments, the substrate may be printed or imaged with indicia, such as care or maintenance instructions. The substrate can be provided with a line of weakness that allows for the tag once completed to be separated from the garment to which it is attached.

The fluid or liquid impervious material is a coated polyester or nylon material that can be ultrasonically welded to the substrate. The material is used to create an air gap or air layer between the RFID inlay and the material. The air gap can impact the impedance of the RFID device. In addition, a conductive gel or conductive particles themselves may be included in the air space in order to improve or enhance read range. They can also serve as a corrective measure should the RFID antenna otherwise become detached from the circuit formed by the antenna and chip.

The RFID device can be provided as an inlay construction, a chip and antenna sandwiched between plastic or PET film layers or the device can be built directly on the substrate itself. Prior to placing the RFID device on the substrate in either form it would be desirable to test the RFID device before installation on the tag structure.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The present invention relates to an innovative garment or apparel tag or label structure that is useful in not only tracking the item through the various stages of manufacturing but is also durable enough to withstand processing and treatment steps that may be used or encountered during manufacture of the garment of post purchase care activity such as washing and dry cleaning.

As used herein the term "tag" or "label" may be used interchangeably to refer to an article identifier that may be attached to a garment or apparel item.

The term "garment" or "apparel" is used herein interchangeably to refer generally to a consumer good, which may be a shirt, blouse, pants, slacks, jacket, sweater, socks, intimate wear, shoes, accessories and the like.

Figure 1:
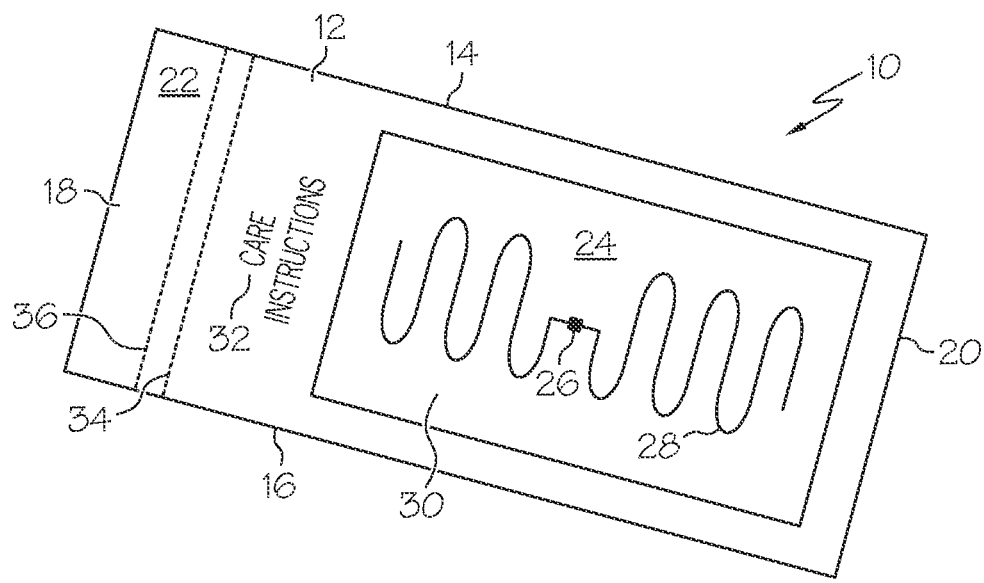
FIG. 1 depicts an intermediate assembly showing the RFID inlay disposed on a substrate.
Figure 2:
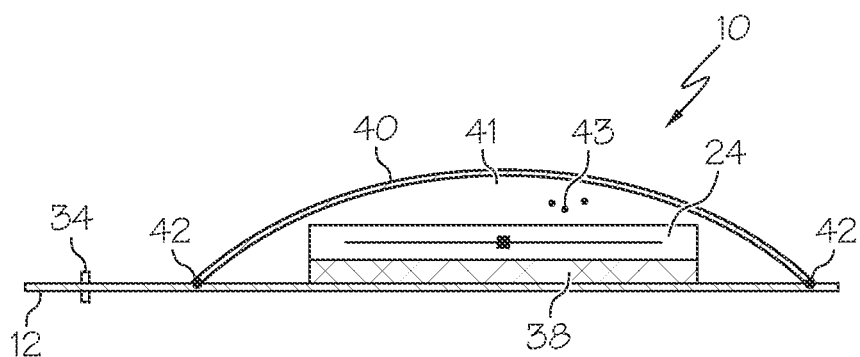
FIG. 2 provides a cross sectional view of the RFID inlay the substrate and covered by a material.

Reference now is directed to FIG. 1 of the presently described invention, which generally includes a garment or apparel tag or label generally designated by reference numeral 10. The tag 10 includes a substrate 12 that has first and second longitudinally extending sides 14 and 16 and first and second transversely extending edges 18 and 20, respectively. The substrate 12 has a first side 22 and a second side (not shown). While the substrate 12 is shown as a single ply of material (see FIG. 2) it should be understood that the substrate 12 could be constructed from a ply of material that is folded over on itself one or more times depending on the desired thickness of the substrate for the end use. The substrate 12 can be selected from any suitable material such as polyester, recycled polyester material, PET, cellulosic stock, recycled paper pulp, card stock, films and foils and the like.

Continuing with reference to FIG. 1, an RFID inlay or device 24 is disposed on the first face 22 of the substrate 12. The RFID device 24 includes a chip 26 and antenna 28. The antenna of the present invention may be a dipole antenna. If the substrate is a foil substrate the antenna of the RFID inlay may be constructed from the foil substrate. The chip 26 and antenna 28 may be placed directly on the substrate 12 or may be created as part of an inlay and constructed on a film layer 30, such as PET, which is a suitable dielectric for the RFID device 24. Exemplary RFID devices or inlays are available from Avery Dennison RFID Company, Clinton, S.C. and are sold under a number of "AD" designations depending on the particular performance criteria required for the application. For example, read range and memory requirements may represent particular performance criteria that may be needed for a particular RFID application.

The substrate 12 can be provided with printed indicia 32 for example, care instructions for use by the retailer or brand information such as the maker and location of the manufacture of the garment. Printing can be applied so as to create a first printed area where the foregoing indicia may be located and a non-printed area which may be covered by the RFID device 24.

A line of weakness 34 may also be provided in the garment or apparel tag 10 so that the tag 10 can be removed from the garment in the event the consumer does not wish to have the device with the garment. The line of weakness preferably is adjacent the first transverse end 18 and runs perpendicular between the first and second longitudinal sides 14 and 16. The line of weakness is another embodiment may run parallel to the first and second longitudinal sides 14 and 16. An attachment line 36 may also be provided, which will generally be parallel to but spaced from the line of weakness to indicate to the garment manufacturer a safe distance by which to attach the tag to the garment or apparel item.

Attention is now directed to FIG. 2a cross sectional elevation is provided of the garment tag 10 of the presently described invention. As with FIG. 1, the garment tag 10 includes a substrate 12 in which the line of weakness 34 is shown extending through the thickness of the substrate 12. In this embodiment, the line of weakness may be a perforation line, which includes a series of cuts and ties of sufficient strength to allow the tag to be attached to the garment but weak enough to allow a consumer to remove the tag 10 should the consumer wish to do so.

The RFID inlay 24 is shown attached to the substrate 12 by a pattern of adhesive 38. Preferably, the adhesive is a permanent adhesive so that the RFID inlay 24 will remain bonded to the substrate. However a removable adhesive is also contemplated by the present invention. Additionally, the adhesive may be a pressure sensitive adhesive.

A fluid or liquid impervious material 40 is positioned so as to cover the RFID inlay 24. The present invention contemplates that the impervious layer may be impervious to other components besides fluids such as dirt particles that may interact with the efficiency of the RFID inlay. The material is a coated polyester material or nylon and treated so as to be able to withstand exposure to acid or enzyme washing, dry cleaning chemicals, detergents, water and the like so as to prevent the RFID inlay 24 from becoming either partly or completely damaged, destroyed or detuned during the processing or treating by a manufacturer or consumer of a garment or apparel item. The material 40 is bonded to the substrate such as by ultrasonic welding, but other attachment means may be used such as stapling, adhesive or the like. The bonding method should however create a generally impervious seal to the RFID tag structure.

The material 40 forms a flexible bag over the RFID device 24 and creates an air space or air gap 41 over the RFID inlay or device 24, which may further impact the tuning requirements of the RFID device 24 so the antenna must be selected to take this criteria into consideration. In addition, the space 41 could be further filled with a conductive fluid or agent such as a gel with conductive particles 43 which could be used to enhance the possible read range of the RFID device 24 and to help correct any detuning which may occur during continued processing and care of the garment. The space 41 could also be filled with an ink that will spill out if the tag having the RFID device is tampered with in a certain way.

Figure 3:
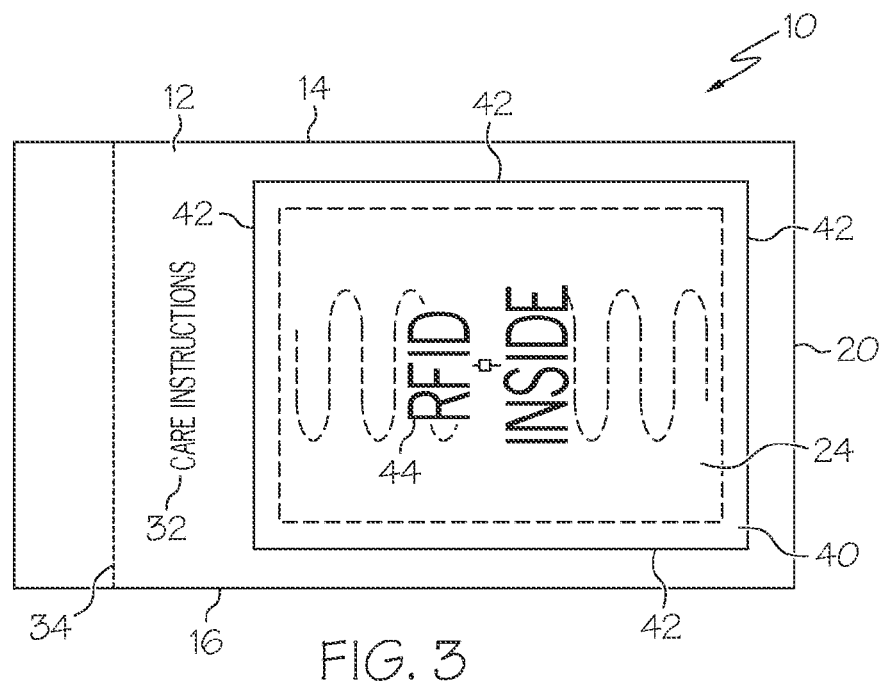
FIG. 3 shows a front elevation of the completed apparel tag assembly.

Reference is now directed to FIG. 3 of the presently described invention in which a top or front elevation view of the RFID tag 10 is provided. The RFID device 24 is shown as being completely enclosed by the material 40 such that the dimension of the RFID device 24 is covered by the size and shape of the material 40. The material 40 is shown as being bonded to the substrate 12 along all sides and generally inward of the substrate longitudinal sides 14 and 16 and closer to end edge 20. That is the RFID inlay 24 and material are disposed closer to end edge 20 than the first end edge 18, which will serve as the attachment and possible detachment point for the tag 10 from the garment.

FIG. 3 also illustrates that the top or outer surface of the material may also be provided with indicia 44 which could serve as a warning that an RFID device 24 is contained within the tag 10 or the indicia 44 could be complementary to the indicia 32, care instructions, or provide other information relating to the garment or apparel item such as the location of the place of manufacture, brand information, removal instructions or the like. In this way, the non-printed area of the substrate is not lost and indicia can be effectively provided over the entire surface of the tag 10.

Figure 4:
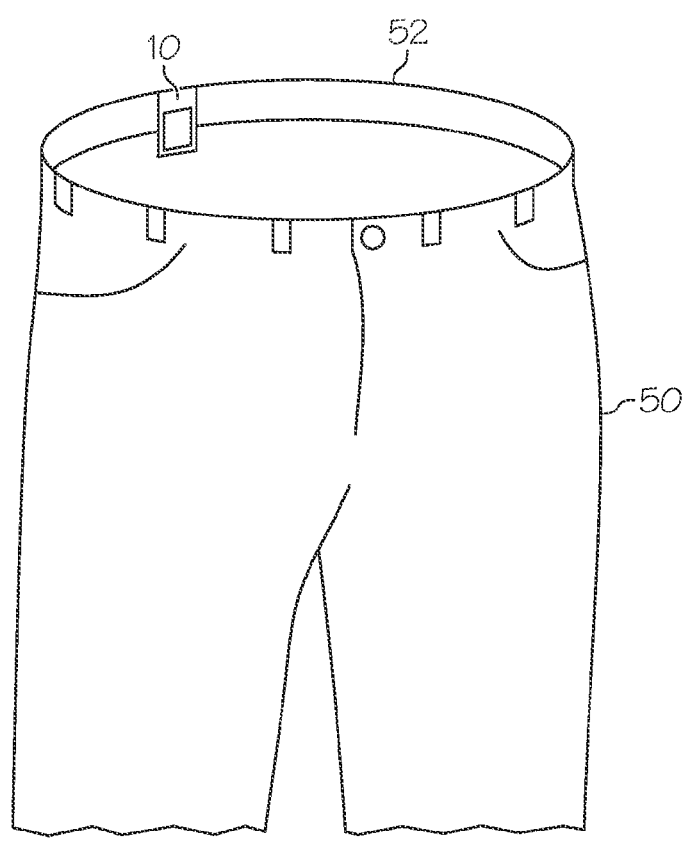
FIG. 4 illustrates the garment tag of the present invention secured to a garment.

Attention is now directed to FIG. 4 of the presently described embodiment which shows the apparel tag 10 attached to a garment 50. The tag 10 may be attached to an area of the garment 50 such that it will be unseen when the garment is being worn, such as to the waist band 52 of a pair of pants or slacks. It should be understood however, that the tag can be attached to the outside of the garment or to another device or tag that can be separated from the garment or apparel item.

Figure 6:
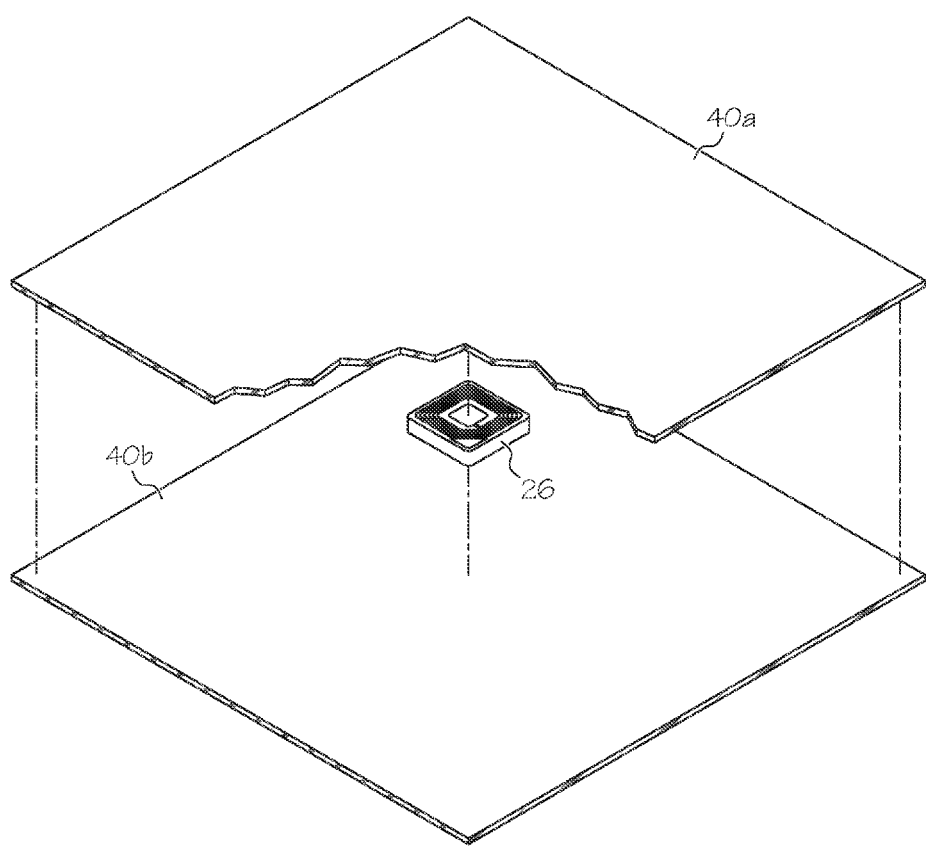
FIG. 6 is an exemplary embodiment showing an RFID inlay between two plastic sheets.

In a further exemplary embodiment of the presently described invention, a RFID garment label is provided and includes a substantially quadrate substrate that has first and second sides and first and second transversely extending edges and first and second longitudinally extending sides. A line of weakness extends between the first and second longitudinally extending sides and is substantially adjacent the first transversely extending end edges. FIG. 6 shows an RFID inlay 26 that has a chip and an antenna and, with the chip and antenna being laminated between plastic films 40*a* and 40*b*. The RFID inlay has first and second sides. A layer of adhesive is provided between the second side of the RFID inlay and the first side of the substrate. The layer of adhesive suitable for the present invention may be a pressure sensitive adhesive either permanent or removable. A fluid impervious layer is disposed over the RFID inlay and is permanently secured to the first side of the substrate and along a greater extent of each of the first and second longitudinal sides and adjacent the second transversely extending end edge. The fluid impervious layer may form a flexible enclosure over the RFID inlay.

Figure 5:
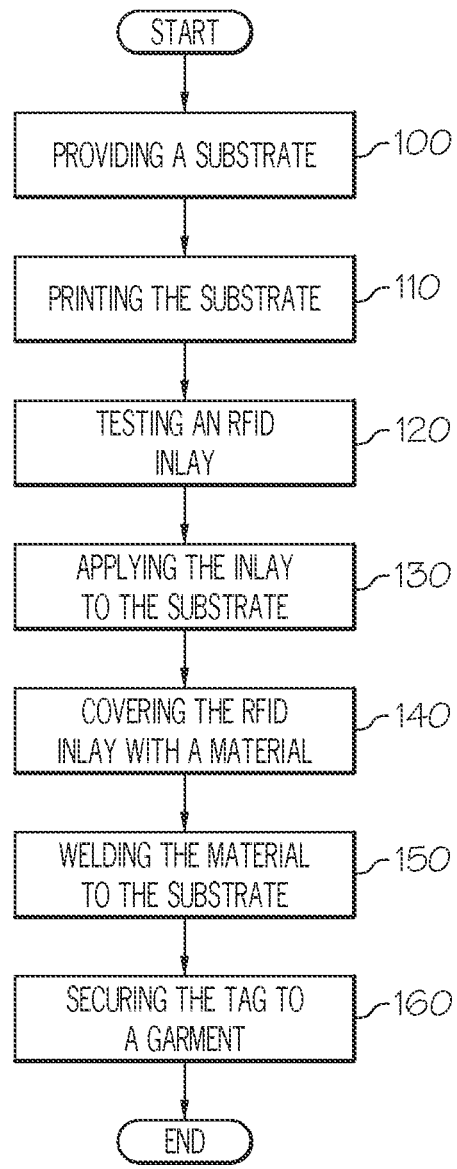
FIG. 5 is a block diagram of an exemplary method of manufacturing the apparel or garment tag of the present invention.

Reference is now directed to FIG. 5 of the presently described embodiment of the present invention in which a block diagram is provided that shows an exemplary method of manufacturing the apparel or garment tag or label as described herein. The process is started at step 100 by providing a substrate. The substrate can be any suitable material and can be provided in a single thickness which may be folded over onto itself depending on the needs of the end use application. Next, at step 110 the substrate can be printed with indicia relating for example to care of the garment, manufacturing or branding information or the like. As used herein, the term "printing" does not refer to solely printing by ink or toner, but rather the printing could be applied by sewing, etching, screen printing or the like. The printing can be preformed in line with the manufacturing process or the substrate may be pre-printed, prior to be supplied to the tag manufacturer.

At step 120, a plurality of RFID inlays or RFID devices are provided and tested so that only functioning and properly performing RFID devices are used in the manufacture of the tags. The RFID devices can be tested before being incorporated into the tag manufacturing process and can be tested again before the tag is attached to a garment.

Next, at step 130 the RFID device is applied to the substrate such as by applying a pattern of adhesive so that the substrate is bonded to the RFID device so that the device will not move during further assembly of the tag. The RFID device is covered at step 140 with a fluid or liquid impervious material such that the entire dimension of the RFID device is enclosed and protected by the covering material. The covering step 140 will also create an air gap or air space between the covering material and the RFID device. The air gap can be filled with a conductive gel (gel containing conductive particles) or alternatively, conductive particles may be added or coated over the inlay area.

Next, the material is welded to the substrate at step 150. The welding is preferably by ultrasonic energy but other means to attach the material to the substrate may be used, such as thermal energy, adhesive bonding, RF energy, mechanical fasteners and the like. Finally, at step 160 the tag is secured to the garment or apparel item to allow tracking and perhaps provider further processing or other information control.

The present invention also contemplates that a printing step 110 may be performed after the material is welded to the substrate.

In another embodiment of the present invention, the inlay is an UHF RFID device.

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods for physiological monitoring of a biological organism using electrical measurements are hereinafter disclosed and described in detail with reference made to FIGURES.

It will thus be seen according to the present invention a highly advantageous RFID apparel tag that can withstand garment treating and processing conditions has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A RFID apparel tag, comprising:
   a substrate having first and second surfaces, first and second longitudinally extending sides and first and second transverse end edges;
   a RFID device having a dimension and having a chip and an antenna contained entirely within the dimension, wherein the entire RFID device is fixedly attached on top of the first surface of the substrate along the entire dimension of the RFID device;
   a liquid impermeable material disposed over the RFID device and extending beyond the dimension of the RFID device in at least a first direction so as to substantially cover the chip and antenna to form a flexible bag and the liquid impermeable material is permanently adhered to the first surface of the substrate; and wherein the material is bonded to the substrate along the longitudinally extending sides and transversely extending edges.

2. The RFID apparel tag as recited in claim 1, wherein the substrate has a longitudinal direction and a transverse direction.

3. The RFID apparel tag as recited in claim 2, wherein the first direction is the longitudinal direction of the substrate.

4. The RFID apparel tag as recited in claim 2, wherein the substrate is provided with a line of weakness in the transverse direction and perpendicular to the first and second longitudinally extending sides.

5. The RFID apparel tag as recited in claim 4, wherein the line of weakness is a perforation line extending completely through a portion of the substrate.

6. The RFID apparel tag as recited in claim 1, wherein the liquid impermeable material extends beyond the entire dimension of the RFID device in both a longitudinal and a transverse direction.

7. The RFID apparel tag as recited in claim 1, wherein the liquid impermeable materials is flexible.

8. The RFID apparel tag as recited in claim 1, wherein the liquid impermeable material is a coated polyester fabric.

9. The RFID apparel tag as recited in claim 1, wherein an air space is formed between the liquid impermeable material and the RFID device.

10. The RFID apparel tag as recited in claim 1, wherein the apparel tag is sewn to a garment.

11. A RFID garment label, comprising:
    a substantially quadrate substrate having first and second surfaces, first and second transversely extending edges, and first and second longitudinally extending sides;
    a line of weakness extending between the first and second longitudinally extending sides and substantially adjacent the first transversely extending edges;
    a RFID inlay having a chip and an antenna and, with the chip and antenna being laminated between plastic films, the RFID inlay having first and second sides;
    a layer of adhesive provided between the second side of the RFID inlay and the first surface of the substrate, wherein the entire second side of the RFID inlay is fixedly attached to the first surface of the substrate;
    a fluid impervious layer disposed over the RFID inlay and permanently secured to the first surface of the substrate and along a greater extent of each of the first and second longitudinal sides and adjacent the second transversely extending edge; and
    wherein the fluid impervious layer forms a flexible bag enclosure over the RFID inlay and is bonded to the substrate along the longitudinally extending sides and transversely extending edges.

12. The RFID garment label as recited in claim 11, wherein the fluid impervious layer is a coated polyester fabric.

13. The RFID garment label as recited in claim 11, wherein the RFID inlay is substantially quadrate.

14. The RFID garment label as recited in claim 11, wherein an air gap is formed between the fluid impervious layer and the RFID inlay.

15. The RFID garment label as recited in claim 11, wherein the second side of the substrate is provided with care indicia.

16. A method of producing a RFID garment tag, comprising the steps of:
    providing a substrate having first and second surfaces, first and second transverse edges, and first and second longitudinal sides;
    fixedly attaching an entire side of an RFID inlay to the first surface of the substrate;
    covering the RFID inlay with a fluid impervious material such that the fluid impervious material substantially covers the RFID inlay to form a flexible bag and an air gap between the RFID inlay and the fluid impervious material wherein the material is bonded to the substrate along the longitudinally extending sides and transversely extending edges;
    welding the fluid impervious material to the first surface of the substrate along each edge of the fluid impervious material to form a garment tag; and
    securing the garment tag to a garment.

17. The method as recited in claim 16, including a further step of testing the RFID inlay prior to the step of applying the inlay to the substrate.

18. The method as recited in claim 16, including a further step of printing the substrate after the step of providing the substrate to provide a first area for care instructions and a second non-printed area for the RFID inlay.

19. The method as recited in claim 16, including a further step of providing a line of weakness in the substrate.

20. The method as recited in claim 16, including a further step of creating an air gap between the fluid impervious material and the RFID inlay prior to the step of welding.

21. The method as recited in claim 16, including folding the substrate after the step of providing the substrate.

22. The method as recited in claim 16, including a further step of testing the RFID inlay prior to the step of securing the RFID inlay to the garment.

23. the method as recited in claim 16, wherein the air gap includes conductive particles.

* * * * *